US012506338B2

(12) United States Patent
Kalathy et al.

(10) Patent No.: US 12,506,338 B2
(45) Date of Patent: Dec. 23, 2025

(54) SYSTEMS AND METHODS FOR CONTROLLING A DC/AC INVERTER FOR USE WITH AN ELECTRIC MOTOR OR AN AC GRID

(71) Applicant: Sparq Systems Inc., Kingston (CA)

(72) Inventors: Abirami Kalathy, Kingston (CA); Suzan Eren, Kingston (CA); Arpan Laha, Kingston (CA); Omid Salari, Kingston (CA); Majid Pahlevaninezhad, Kingston (CA); Praveen Jain, Kingston (CA)

(73) Assignee: Sparq Systems Inc., Kingston (CA)

( * ) Notice: Subject to any disclaimer, the term of this patent is extended or adjusted under 35 U.S.C. 154(b) by 14 days.

(21) Appl. No.: 18/606,651

(22) Filed: Mar. 15, 2024

(65) Prior Publication Data

US 2025/0293519 A1 Sep. 18, 2025

(51) Int. Cl.
*H02J 3/00* (2006.01)
*H02J 3/38* (2006.01)
*H02P 23/18* (2016.01)

(52) U.S. Cl.
CPC .............. *H02J 3/004* (2020.01); *H02J 3/388* (2020.01); *H02P 23/18* (2016.02); *H02J 2300/26* (2020.01)

(58) Field of Classification Search
CPC ........ H02J 3/004; H02J 3/388; H02J 2300/24; H02J 2300/26; H02P 23/18
USPC .......................................................... 307/18
See application file for complete search history.

(56) References Cited

U.S. PATENT DOCUMENTS

2011/0216562 A1* 9/2011 Gengenbach ......... H02M 1/126
363/71

* cited by examiner

*Primary Examiner* — Hal Kaplan
(74) *Attorney, Agent, or Firm* — Brion Raffoul

(57) ABSTRACT

Systems and methods relating to controlling power from renewable power sources. There is provided a control system that uses a non-linear controller for controlling currents in a DC/AC inverter especially when the DC/AC inverter is providing PV power to a 3-phase motor when the system is in an off-grid mode. In on-grid mode, a power grid is coupled to the DC/AC inverter and the control system provides MPPT to provide PV power to the grid. In off-grid mode, the grid is not coupled to the DC/AC inverter. The non-linear controller is based on differentiable manifolds that are also Lie groups. In off-grid mode, this non-linear controller finds the correct phase and frequency for the inverter current for the motor. The frequency is the output of the Lie group-based controller and is generated based on the voltage and current vectors of the motor.

9 Claims, 12 Drawing Sheets

SYSTEMS AND METHODS FOR CONTROLLING A DC/AC INVERTER FOR USE WITH AN ELECTRIC MOTOR OR AN AC GRID

TECHNICAL FIELD

The present invention relates to systems and methods for controlling power from renewable power sources. More specifically, the present invention relates to a control system that uses a differential geometric controller (based on Lie groups) for controlling currents in a DC/AC inverter.

BACKGROUND

There is a growing number of photovoltaic (PV) applications where direct current/alternating current (DC/AC) inverters are required to provide maximum power point tracking (MPPT) to harvest maximum solar energy from PV panels and to thereby feed clean AC electricity into loads and/or a power grid. Depending on the system size, single-phase and three-phase PV inverters are used to convert power from DC to AC. Single-phase inverters are usually used for low power applications (e.g., residential and small commercial) while three-phase inverters are used for high power applications (e.g., large commercial and solar farms).

Single-phase micro-inverters are used extensively in single-phase applications due to their attractive features such as individual MPPT, high performance, and ease of installation. However, their relatively high costs may be a setback. In order to make this superior solution more cost-effective, three-phase micro-inverters with higher power have been introduced. Three-phase micro-inverters open substantial opportunities and allow the use of micro-inverters with superior performance for higher power applications such as large commercial sites and solar farms.

One of the main opportunities offered by three-phase micro-inverters is the opportunity to drive three-phase motors. This includes many applications such as agricultural water pumps, flour mills, etc. Although the three-phase solar-based motor drives open up many prospects, there are several challenges that need to be addressed. These challenges mainly stem from the intermittency of the solar energy harvested by the PV panels. This intermittency places several harsh constraints on the performance of the control systems for three-phase PV micro-inverters. While some of these constraints can be alleviated by known methods, such methods cannot fully address various issues caused by transients and severe fluctuations in the operating conditions. As well, when such known methods are used, they usually fail to produce optimal performance for the system as a whole.

FIG. 1 shows a typical block diagram of an existing solar energy harvesting systems with motor drive capability according to the prior art. As can be seen from FIG. 1, two-stage power electronic converters are used in the system. The DC/DC converter converts a low-voltage DC power from the PV panel into a high-voltage DC power at the DC-bus. A DC/AC inverter is then used to convert the DC power into a three-phase AC power compatible with the utility grid and/or three-phase motor. The control system of the power converters is of great importance in order to provide reliable operation for the power conditioning system.

Referring to FIG. 2, illustrated is a block diagram of a typical control system for a DC/AC inverter. The control system is responsible for controlling the speed of the motor such that it follows a reference signal. This is usually done using a closed loop control system. There are three main ways to perform the speed control: voltage/frequency (V/f) control, field-oriented control (FOC), and direct torque control (DTC). V/f control is a simple method that does not need a speed sensor and is an open-loop method. For this method, the flux is kept nearly constant by maintaining a constant ratio between the magnitude of the voltage applied to motor and its frequency. This method cannot guarantee precise speed control and usually results in sub-optimal operation. For the second method, the FOC method can address the disadvantages of the V/f control by controlling the system based on the field vector. While optimal operation can be achieved with the FOC method for many applications, the method needs motor speed information and is fairly complicated to implement. For the third method, DTC (direct torque control), the torque is directly controlled using the motor currents. In this method, the position of the rotor is required, something that is not very practical in many applications. In addition, DTC is usually implemented using the mathematical model of the motor, and, unfortunately, this increases the computational intensity for the method. This also renders the method to be prone to parameter variations/uncertainties.

The speed controller (e.g., a Proportional-Integral or PI controller) usually produces a signal which determines the value for current reference. This value, along with certain schemes (e.g., Maximum Torque Per Amp (MTPA)) determines the appropriate reference signals for the currents. The current controller can be implemented in different well-known frames such as the ABC-stationary frame, $\alpha\beta$-stationary frame, and dq-rotating frame. As an example, FIG. 2 shows the current controller in the dq-frame.

There are several challenges with the control methods used in the prior art. One of the main issues is related to fluctuations in the solar power on the PV side. Existing control systems according to the prior art cannot properly handle these fluctuations and the system often collapses and cannot rotate the motor during these fluctuations. This is exacerbated by the fact that micro-inverters do not have a large storage capacity. Usually, a relatively small DC-bus capacitor is used for storage. When such a device is used, the dynamics of the DC-bus will adversely impact the control system during these fluctuations. Thus, current systems can operate reliably only when a stable grid is connected, or the solar power is fairly high with minimal fluctuations. Otherwise, the system is not reliable.

The other main challenge for these control methods is related to the transients on the load side. Motors usually require a high amount of current at the start. In addition, during load transients, the load demand may substantially increase. This can overload the micro-inverter and can cause the system to collapse. The low storage capacity of micro-inverters intensifies this issue as it causes a mismatch between the harvested energy and the load demand during transients. Thus, the system reliability may be highly compromised during such transients.

Based on the above, there is therefore a need for systems and devices which mitigate if not avoid the shortcomings of the prior art.

SUMMARY

The present invention provides systems and methods relating to controlling power from renewable power sources. There is provided a control system that uses a non-linear controller for controlling currents in a DC/AC inverter especially when the DC/AC inverter is providing PV power to a 3-phase motor when the system is in an off-grid mode. In on-grid mode, a power grid is coupled to the DC/AC inverter and the control system provides MPPT to provide PV power to the grid. In off-grid mode, the grid is not coupled to the DC/AC inverter. The non-linear controller is based on differentiable manifolds that are also Lie groups. In off-grid mode, this non-linear controller finds the correct phase and frequency for the inverter current for the motor. The frequency is the output of the Lie group-based controller and is generated based on the voltage and current vectors of the motor.

In a first aspect, the present invention provides a system for converting power from at least one renewable power source into power suitable for use either a 3-phase power grid or a 3-phase electric motor, the system comprising:
- at least one DC/DC converter receiving power from said renewable power source and transmitting DC power from said at least one renewable power source to a DC bus;
- a three-phase DC/AC inverter receiving DC power from said at least one DC/DC converter by way of said DC bus, said DC/AC inverter converting said DC power from said DC bus into three phase AC power suitable for said power grid or said electric motor;
- a control subsystem for controlling switches in said DC/AC inverter based on sensed output currents and voltages output from said inverter, said control subsystem determining reference vector fields based on said sensed output currents and voltages from said inverter and on sensed input currents and voltages from said DC bus, said reference vector fields being used by said control subsystem to generate switching signals for said switches in said DC/AC inverter.

In a second aspect, the present invention provides a control subsystem for controlling switches in an inverter, the subsystem comprising:
- a DC/DC control block for controlling at least one DC/DC converter, said DC/DC control block receiving sensed currents and voltages from at least one renewable power source;
- a motor identification block for determining characteristics of an electric motor, said motor identification block receiving said sensed output currents and voltages and a voltage for a DC bus that receives power from said at least one DC/DC converter;
- a differential geometric controller receiving outputs of said motor identification block and said DC/DC control block;
- a modulator block for producing control signals for controlling said switches in said inverter, said modulator block receiving outputs of said differential geometric control block and using said outputs of said differential geometric control block to produce said control signals.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
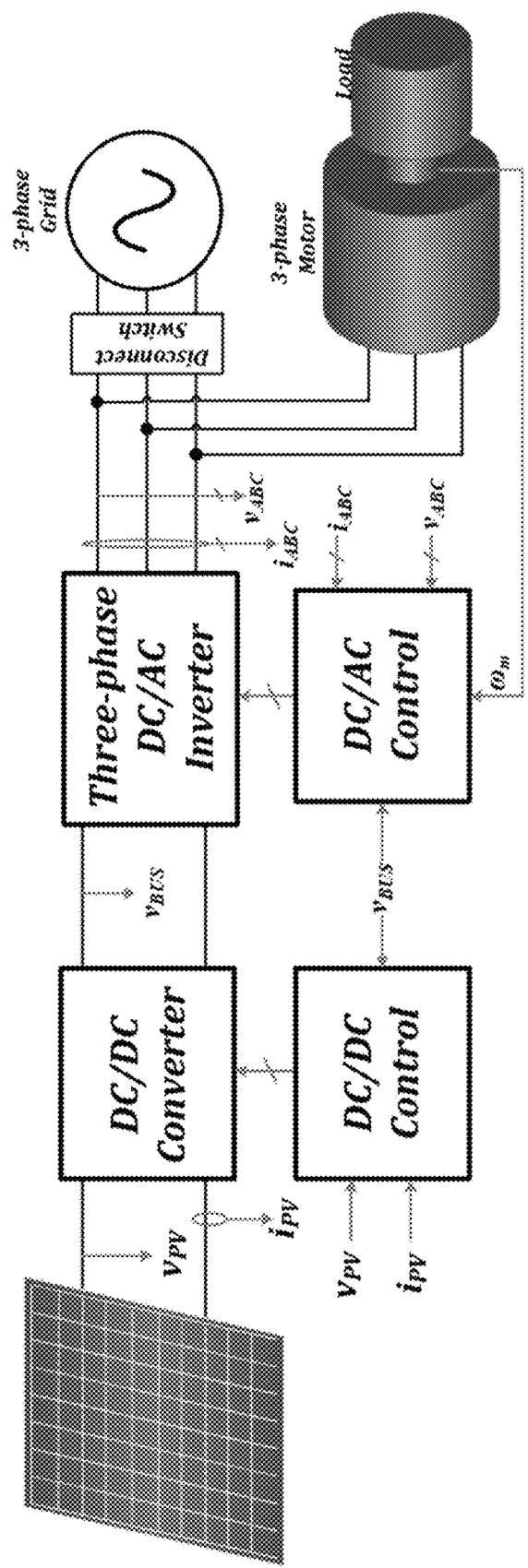
FIG. 1 is a PV-based system according to the prior art.
Figure 2:
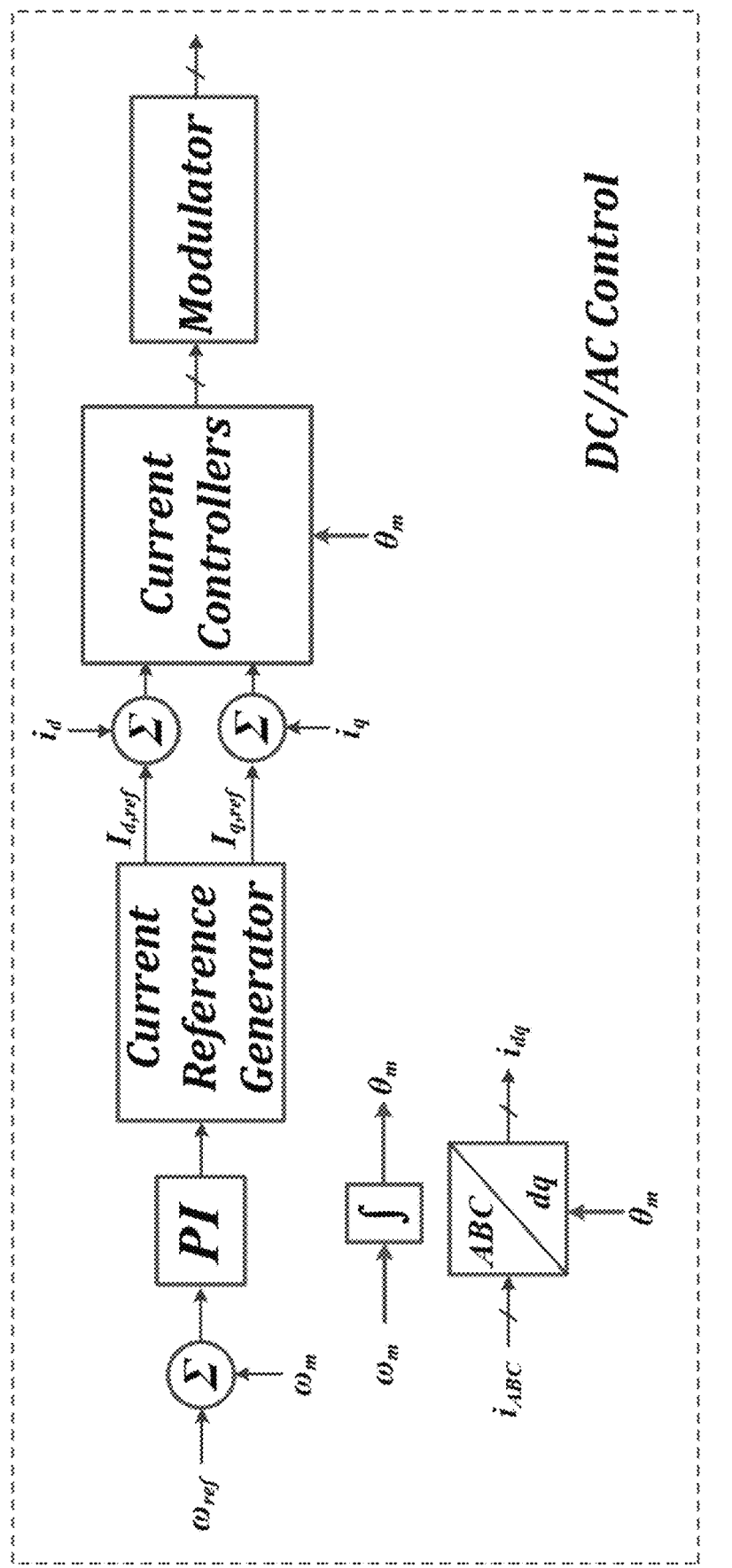
FIG. 2 is a DC/AC control system according to the prior art.
Figure 3:
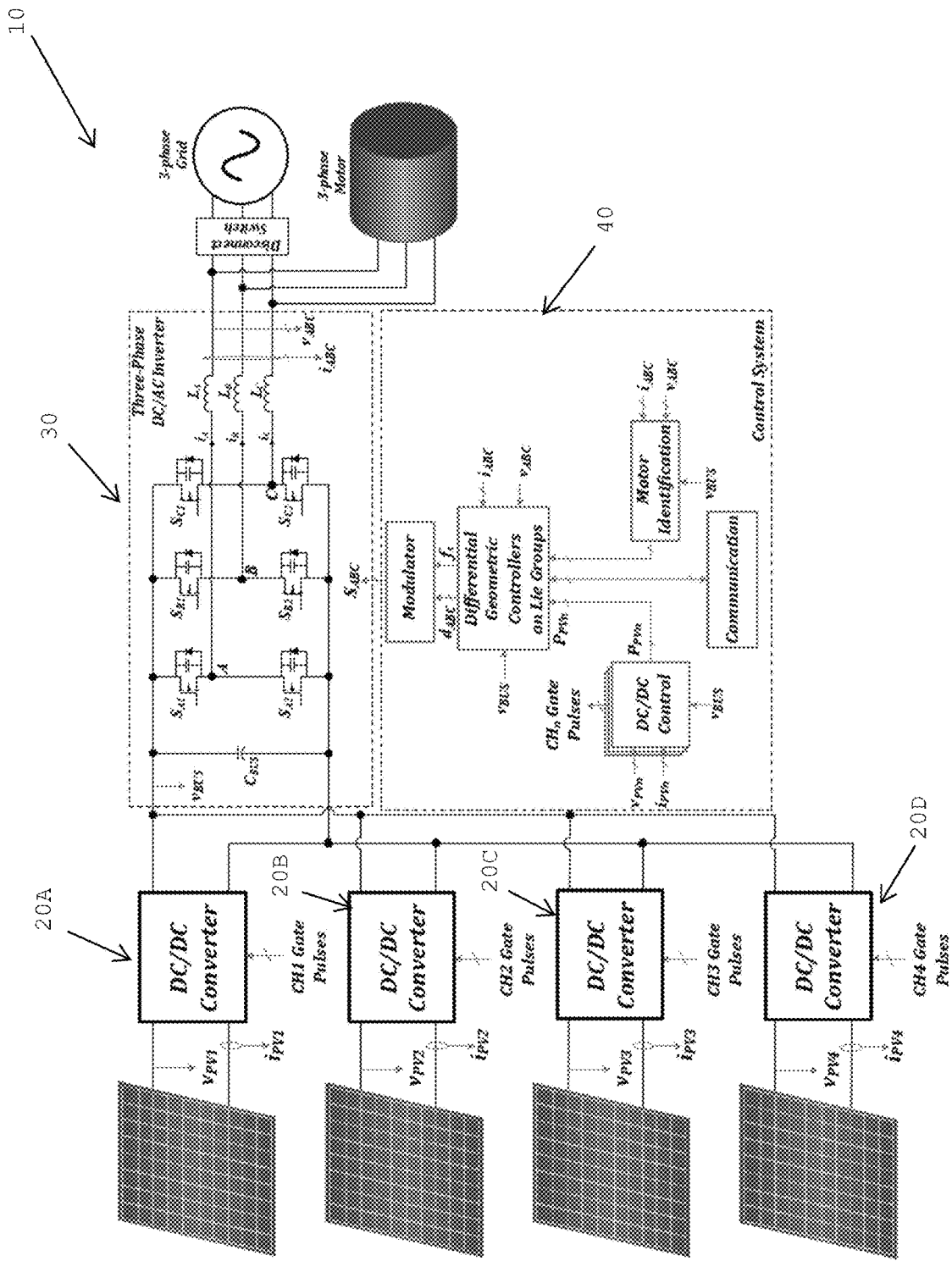
FIG. 3 is a PV-based system for use with a three-phase power grid and a three phase electric motor according to one aspect of the present invention.

Referring to FIG. 3, the block diagram of a three-phase micro-inverter with robust motor drive capability according to one aspect of the present invention is shown. As can be seen from the figure, the micro-inverter 10 includes the following blocks:
- Multiple DC/DC Converters 20A, 20B, 20C, 20D, each of which is responsible for extracting power from its PV panel and for delivering that power to the DC-bus.
- A three-phase DC/AC inverter 30, which is responsible for converting the DC power at the DC-bus to a three-phase AC power compatible with the grid and/or local loads including three-phase motors.
- A control system 40, which is responsible for performing various control tasks such as maximum power point tracking (MPPT) of the PV panels, controlling the grid currents in the grid-connected mode, controlling speed/torque of the motor in the off-grid mode, communicating with external equipment, etc. The control system is based on differential geometry, which allows for the robust motor drive control for the micro-inverter.

For clarity, the system of the present invention uses an inverter with two modes of operation—on-grid and off-grid. In the on-grid mode, the inverter receives power from the DC/DC converters and performs MPPT (maximum power point tracking) to transfer power to the grid and/or the motor. In off-grid mode, the grid is disconnected and the power from the DC/DC converters must be transferred to the motor. For clarity, in off-grid mode, MPPT is not performed as the supply and demand balance between the power from the PV panels (and hence the DC/DC converters) and the power consumed by the motor must always be satisfied. MPPT is inappropriate for off-grid mode as, if the PV panels generate more power than needed by the motor, the inverter will deviate from the maximum power point.

Thus, the system of the present invention uses a nonlinear controller for motor control in the off-grid mode. As is known, linear PI (proportional-integral) controllers are used for motor control. In the present system, in off-grid mode, a non-linear controller based on differentiable manifolds that are also Lie groups is used. Using such a non-linear controller allows for much better performance during transients. The rotation Lie groups are used to find the correct phase and frequency for the inverter current for the motor. The frequency is the output of the Lie group controller and is generated based on the voltage and current vectors of the motor ($V_{ABC}$ and $i_{ABC}$) as sensed from the output of the inverter. The voltage and current vectors are sensed and converted into independent current and voltage variables for use by the rotation control on Lie group sub-block and by the current controller. The system, in off-grid mode, directly modulates the frequency of the motor drive to maximize the torque output of the motor. The non-linear controller, in essence, adjusts the speed of the motor such that the power demand is matched with the harvested power from the PV panels.

To better understand the present invention, Lie groups are essentially smooth manifolds that form a group under a group operation '*', such that the elements of any lie group G are closed under the group operation and satisfy the following conditions:

Existence of identity: $\epsilon * X = X * \epsilon = X \forall X \in \mathcal{G}$
Existence of inverse: $X^{-1} * X = X * X^{-1} = \epsilon \forall X \in \mathcal{G}$
Associativity: $X*(Y*Z)=(X*Y)*Z \; \forall X, Y, Z \in \mathcal{G}$ A smooth manifold is a topological space that can be visualized as a curved structure but locally resembles a flat Euclidean space. Due to the smoothness of the manifold, a unique tangent space exists at each point of the manifold which is a linear vector space. Moreover, these tangent spaces have the same structure at all the points on the manifold.

Figure 4:
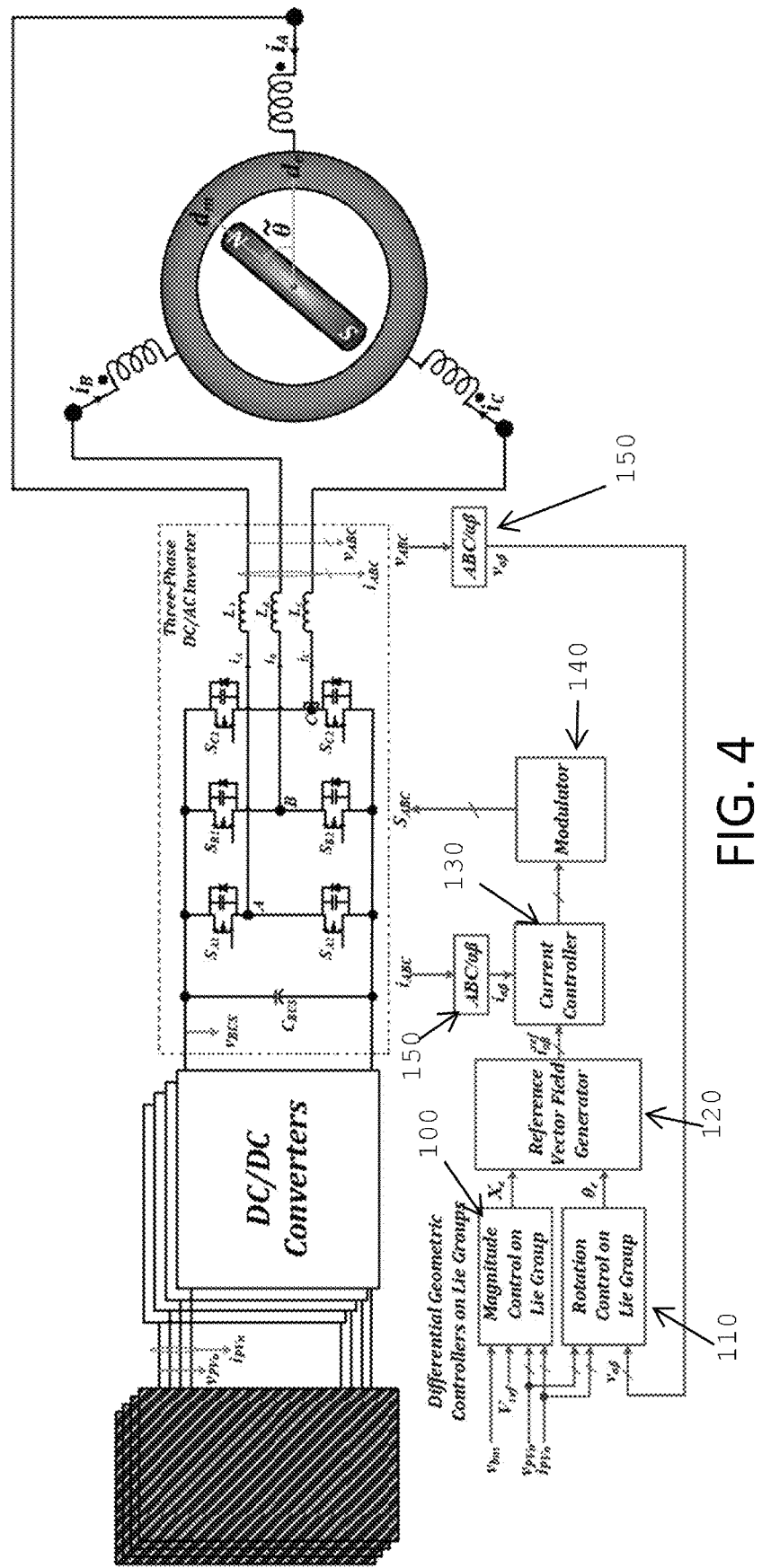
FIG. 4 is a block diagram detailing the components in a differential geometric controller according to another aspect of the present invention.

Referring to FIG. 4, illustrated is an exemplary arrangement of sub-blocks used with the Differential Geometric Controllers on Lie Groups according to one aspect of the present invention. According to this figure, the system according to the present invention uses the following sub-blocks:

A Magnitude Control on Lie Group sub-block 100 that receives the DC-bus voltage, $v_{bus}$, the DC-bus voltage reference value, $V_{ref}$, the PV panels' voltages and currents, $V_{PV_n}$ and $i_{PV_n}$, and which produces the appropriate magnitude vector field, $X_e$, for the inverter currents.

A Rotation Control sub-block 110 that receives the voltage signals in the αβ-frame, $v_{\alpha\beta}$, and the PV panels' voltages and currents, $v_{PV_n}$ and $i_{PV_n}$, and produces the appropriate rotation angle of the vector field, $\theta_e$, for the inverter currents.

A Reference Vector Field Generator sub-block 120 that receives the magnitude vector field, $X_e$, and the rotation angle of the vector field, $\theta_e$, and which produces the current references, $i_{\alpha\beta}^{ref}$, in the αβ-frame for the inverter currents.

A Current Controller sub-block 130 that receives the current references, $i_{\alpha\beta}^{ref}$, and the inverter currents, $i_{\alpha\beta}$, and which produces appropriate duty cycle and switching frequency signals for the Modulator sub-block.

A Modulator sub-block 140, which produces appropriate switching pulses, $S_{ABC}$, based on the duty cycle and switching frequency signals.

There are also common ABC-to-αβ conversion blocks 150, which convert a set of balanced three-phase variables (ABC) to two independent variables (αβ), and given by:

$$X_{\alpha\beta} = TX_{ABC}, \text{ where}$$

$$T = \frac{2}{3}\begin{pmatrix} 1 & -1/2 & -1/2 \\ 0 & \sqrt{3}/2 & -\sqrt{3}/2 \end{pmatrix}$$

Figure 5A:
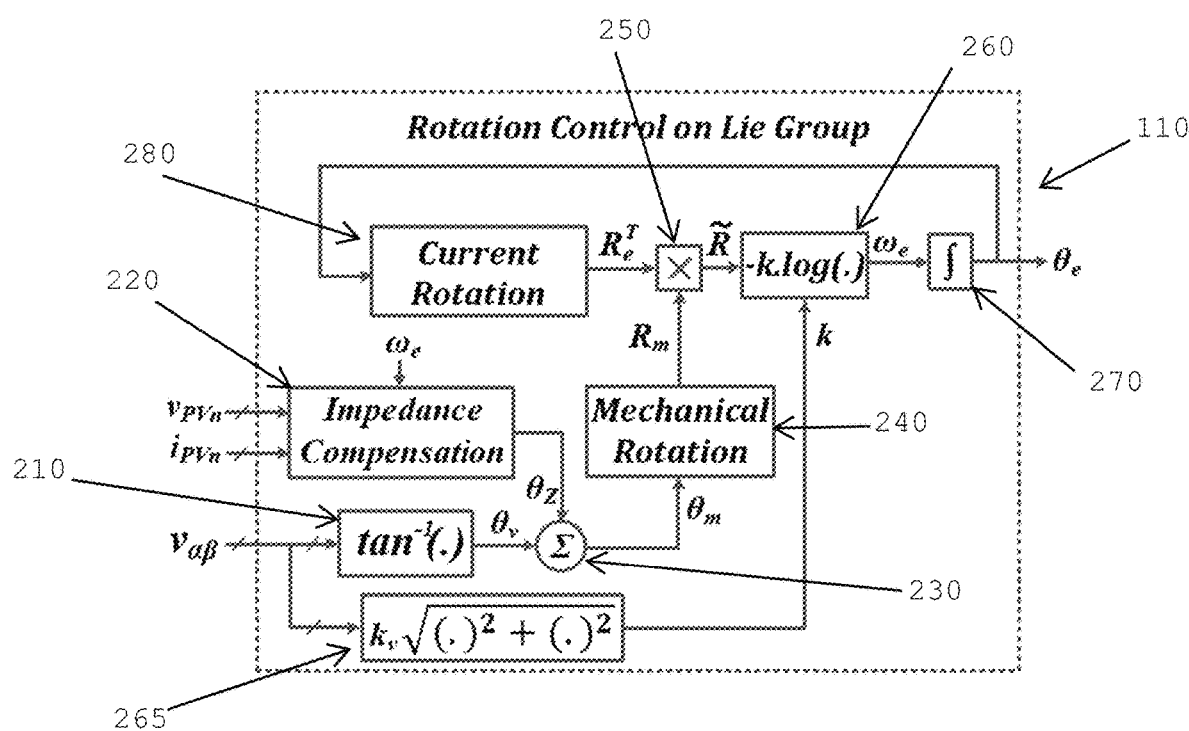
FIG. 5A is a block diagram illustrating the components for a Rotation Control on Lie Group sub-block according to another aspect of the present invention.

Referring to FIG. 5A, an exemplary arrangement of a Rotation Control on Lie Group sub-block 110 is depicted. As can be seen from the figure, the Rotation Control on Lie Group sub-block 110 includes the following subblocks:

A $\tan^{-1}(.)$ sub-block 210 that receives the voltage signals in the αβ-frame, $v_{\alpha\beta}$, and that produces the rotation angle of the inverter output voltage by:

$$\theta_v = \tan^{-1}(v_\alpha, v_\beta)$$

This block 210 takes two components of the voltage, $v_\alpha$, and $v_\beta$, and finds the voltage angle, $\theta_v$.

An Impedance Compensation subblock 220 that compensates for any phase-shift angle caused by the impedance of the motor windings. This angle is useful in finding the true back-emf (electromagnetic force) angle, which has the true information of the rotor speed. This sub-block 220 receives the voltages and currents, $V_{PV_n}$ and $i_{PV_n}$, of the PV panels. These voltages and currents are proportional to the motor currents and the electrical frequency, $\omega_e$, and then produces the appropriate impedance angle, $\theta_Z$, for the inverter currents.

A Summation sub-block 230 that combines the voltage angle, $\theta_v$, and the impedance angle, $\theta_Z$, to generate the angle of the back-emf, $\theta_m$.

A Mechanical Rotation sub-block 240 that receives the voltage signals in the back-emf angle, $\theta_m$, and produces the mechanical rotation matrix in the Lie group SO(2) as (SO(2) is the group of Special Orthogonal matrices, which perform rotation in $\mathbb{R}^2$):

$$R_m(\theta_m) = \begin{pmatrix} \cos\theta_m & -\sin\theta_m \\ \sin\theta_m & \cos\theta_m \end{pmatrix}$$

A Multiplication sub-block 250 that multiplies the mechanical rotation matrix, $R_m$, by the transpose of the electrical rotation matrix, $R^T_e$, to calculate the rotation error matrix, $\tilde{R}$:

$$\tilde{R} = R_e^T R_m = \begin{pmatrix} \cos\tilde{\theta} & -\sin\tilde{\theta} \\ \sin\tilde{\theta} & \cos\tilde{\theta} \end{pmatrix} \text{ where } \tilde{\theta} = \theta_m - \theta_e$$

A Lie algebraic controller sub-block 260 that multiples the rotation error matrix, $\tilde{R}$, by the Lie algebraic controller:

$$\omega_e = -k \cdot \log(\tilde{R})$$

Here, k (see block 265) is calculated based on the magnitude of the voltage, $v_{\alpha\beta}$, and the logarithmic map, log(.), is a mapping between the Lie group, SO(2), and its Lie algebra, $\mathfrak{so}(2) \cong \mathbb{R}$, given by:

$$\log: SO(2) \to \mathfrak{so}(2) \cong \mathbb{R}$$
$$\tilde{R} \mapsto \omega_e = -\log(\tilde{R})$$

Figure 5B:
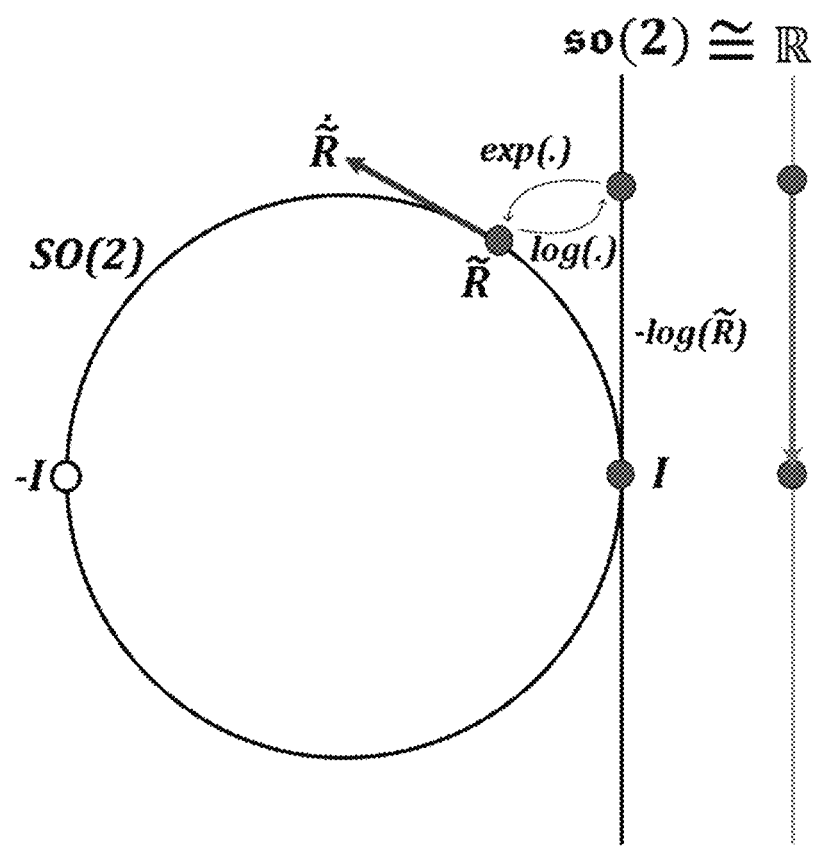
FIG. 5B schematically details the function of the sub-block illustrated in FIG. 5A.

The above can be seen with reference to FIG. 5B.

An Integrator sub-block 270 that integrates the electrical frequency, $\omega_e$, in order to calculate the electrical angle, $\theta_e$.

A Current Rotation sub-block 280 that receives the electrical angle, $\theta_e$, and produces the transpose of the electrical rotation matrix, $R^T_e$, (rotation matrix in the Lie group SO(2) as:

$$R^T_e(\theta_e) = \begin{pmatrix} \cos\theta_e & \sin\theta_e \\ -\sin\theta_e & \cos\theta_e \end{pmatrix}$$

As noted above, in off-grid mode, the differential controller adjusts the speed of the motor such that the power demand is matched with the harvested power from the PV panels. This is especially useful during transients as maintaining the power balance is very challenging during transients. Prior art systems are well-known to fail and collapse during transients.

Figure 6:
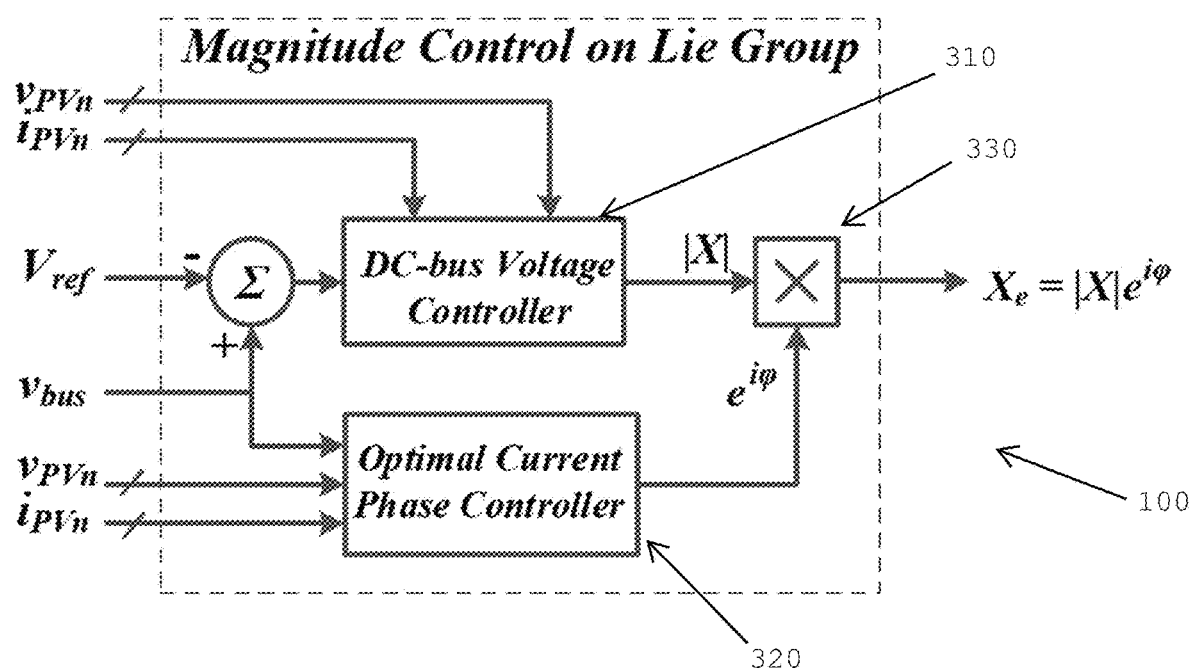
FIG. 6 is a block diagram illustrating the components in a Magnitude Control on Lie Group sub-block according to another aspect of the present invention.

Referring to FIG. 6, illustrated is an exemplary arrangement of a Magnitude Control on Lie Group sub-block 100. This sub-block produces the appropriate magnitude vector field, $X_e$, for the inverter currents. According to FIG. 6, this sub-block 100 includes the following sub-blocks:

A DC-bus controller sub-block 310 that receives the error signal of the DC-bus voltage, $e_v = v_{bus} - V_{ref}$, from the Summation block and the voltages and currents, $v_{PVn}$ and $i_{PVn}$, from the PV panels and produces the appropriate magnitude for the inverter currents, |X|. The voltages and currents from the PV panels are used to determine the input power of the converter and to adjust the magnitude of the inverter output currents accordingly. The information of the input PV power can act as a feedforward term, effectively eliminating the dynamics of the DC-bus capacitor.

An Optimal Current Phase Controller sub-block 320 that receives the DC-bus voltage signal, $v_{bus}$, and voltages and currents, $v_{PVn}$ and $i_{PVn}$, from the PV panels and produces the appropriate phase angle, $e^{i\varphi}$, for the magnitude vector field, $X_e$.

A Multiplier sub-block 330 that combines the magnitude for the inverter currents, |X| and the phase angle, $e^{i\varphi}$, to produce the magnitude vector field, $X_e$.

Figure 7:
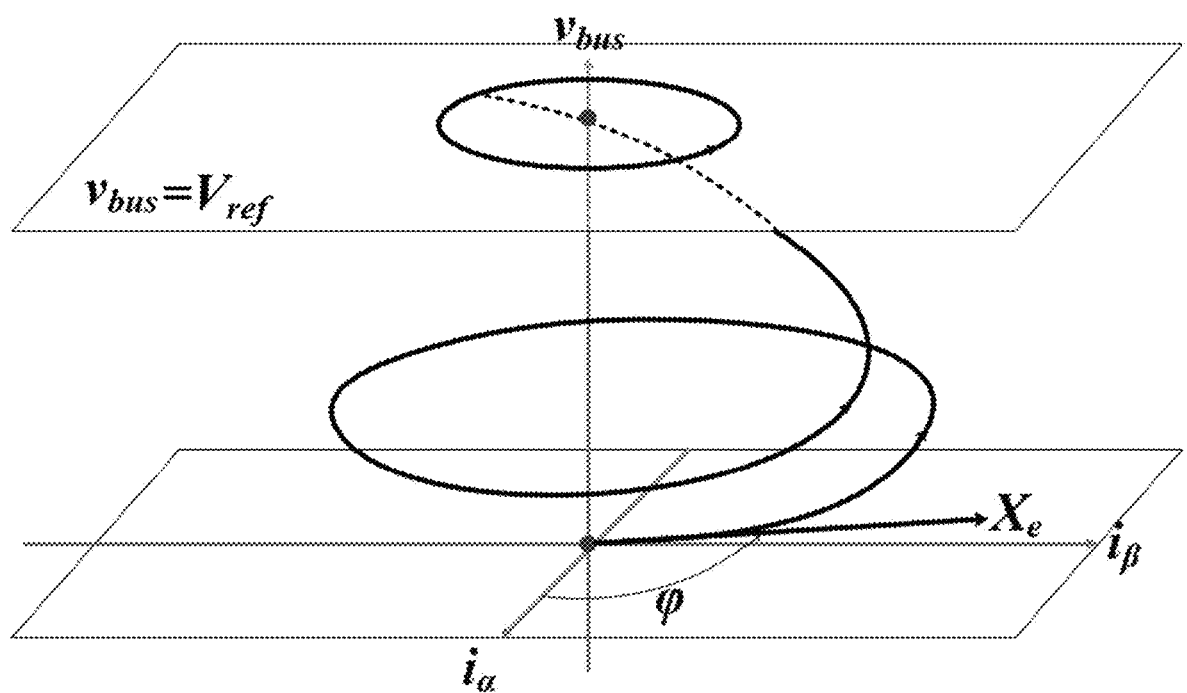
FIG. 7 schematically illustrates the function of the sub-block illustrated in FIG. 6.

Referring to FIG. 7, the conceptual diagram of the exemplary arrangement of the Magnitude Control on Lie Group block. According to this figure, the Optimal Current Phase Controller determines the initial phase of the vector field such that the system is steered on an optimal trajectory. This phase is determined by various factors such as the type of the motor, available PV power etc.

Figure 8:
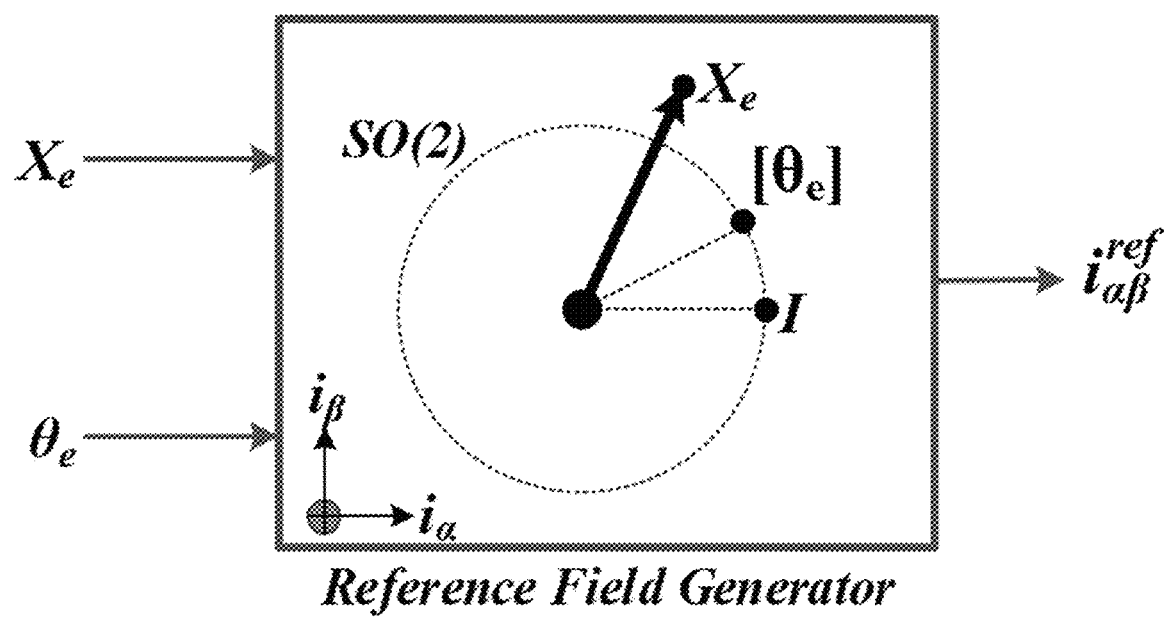
FIG. 8 is a schematic diagram illustrating the function of the reference field generator according to another aspect of the present invention.

Referring to FIG. 8, the exemplary arrangement of the Reference Field Generator is depicted, which receives the magnitude vector field, $X_e$, and the electrical angle, $\theta_e$, in order to generate the reference signals for the inverter currents, $i^{ref}_{\alpha\beta}$. This block illustrates how the rotation matrix, $[\theta_e]$, on the Lie group act on the vector field, $X_e$. In this block, the reference signals for the inverter currents, $i^{ref}_{\alpha\beta}$, are calculated as follows:

$$i^{ref}_{\alpha\beta} = \begin{pmatrix} i^{ref}_\alpha \\ i^{ref}_\alpha \end{pmatrix} = X_e \cdot [\theta_e]$$

where $$[\theta_e] = \begin{pmatrix} \cos\theta_e & -\sin\theta_e \\ \sin\theta_e & \cos\theta_e \end{pmatrix}$$

$$X_e = \begin{pmatrix} x^{ref}_{e,\alpha} \\ x^{ref}_{e,\beta} \end{pmatrix}$$

Figure 9A:
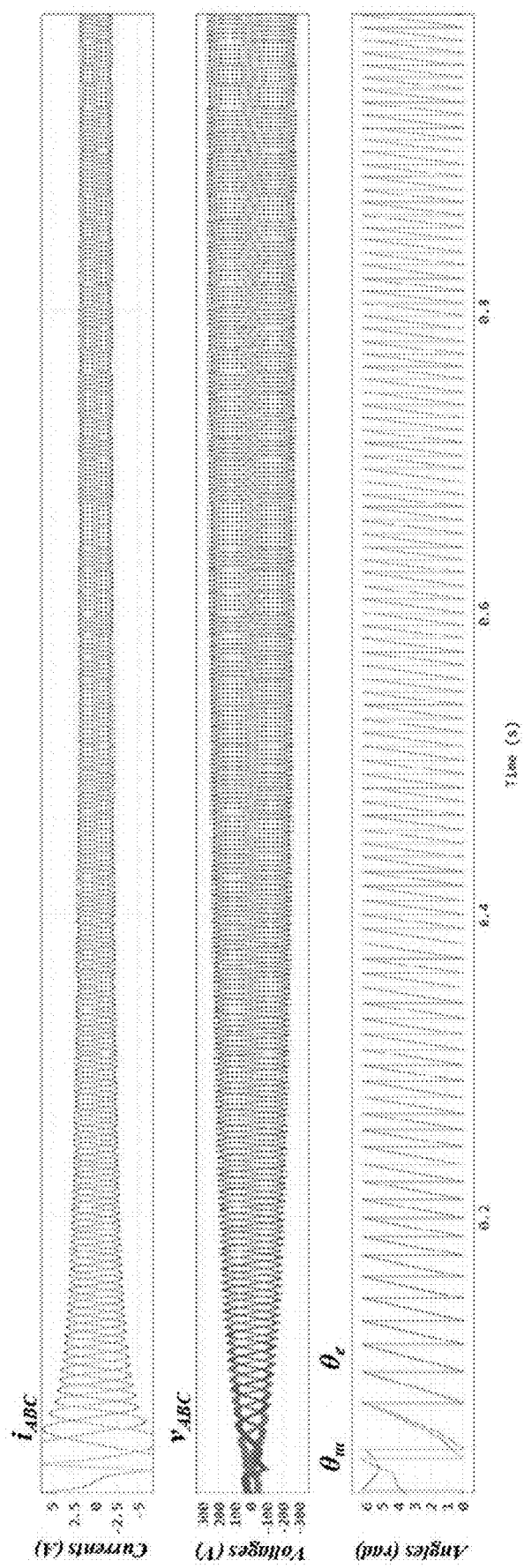
FIGS. 9A, 9B, 9C are key waveforms obtained using the present invention for different PV conditions.
Figure 9B:
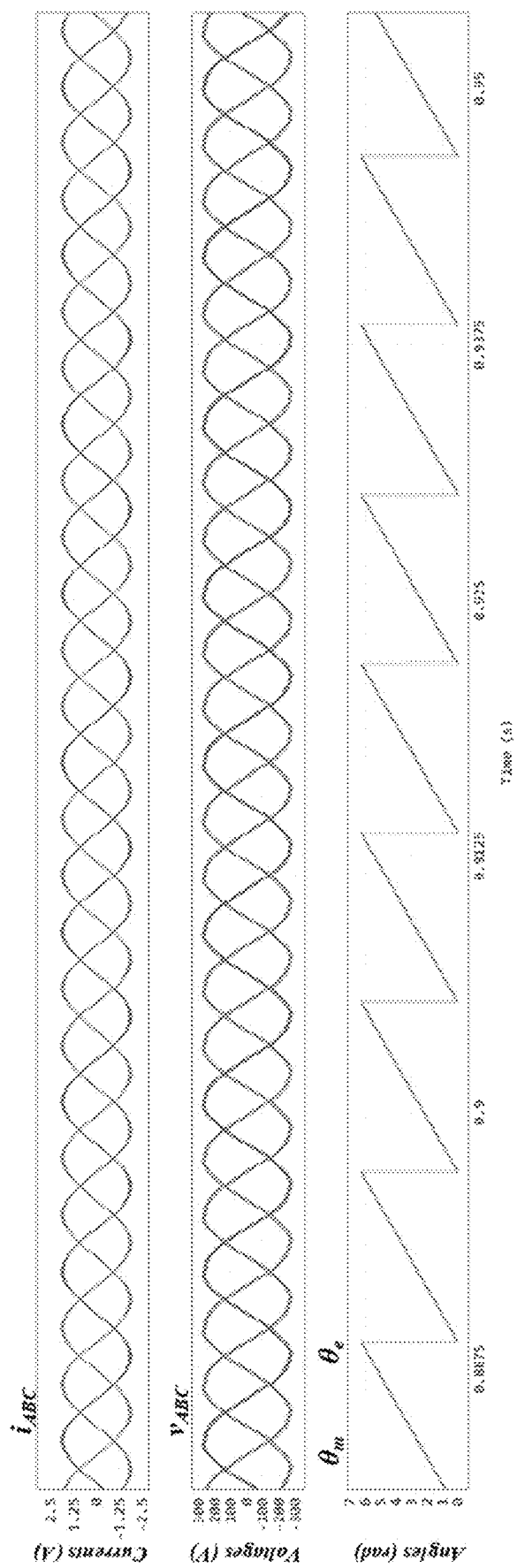
Figure 9C:
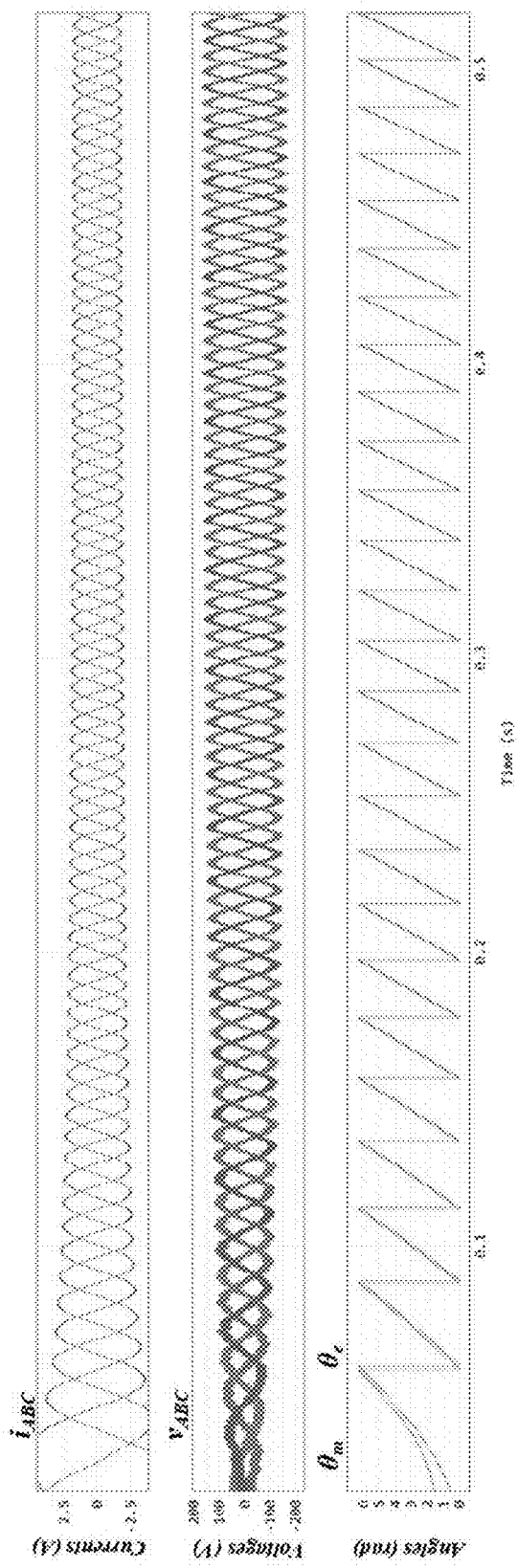

FIGS. 9A-9C shows key waveforms for different PV power conditions. Each figure shows the inverter three-phase currents, $i_{ABC}$, the inverter three-phase voltages, $v_{ABC}$, and the mechanical angle, $\theta_m$, and the electrical angle, $\theta_e$ for these different PV power conditions.

In terms of implementation, the various aspects of the present invention may be implemented using well-known technologies such as digital signal processors (DSPs), microcontrollers, FPGAs (fixed pin grid arrays), and any other similar digital platform. For other implementations, the present invention may also be implemented using an analog controller.

It should be clear that the various elements and components of the present invention may be used with different types of renewable energy sources and not just photovoltaic panels. As examples, instead of PV panels, the present invention may use wind, wave, and geothermal power sources.

A person understanding this invention may now conceive of alternative structures and embodiments or variations of the above all of which are intended to fall within the scope of the invention as defined in the claims that follow.

We claim:

1. A system for converting power from at least one renewable power source into power suitable for use by either a 3-phase power grid or a 3 phase electric motor, the system comprising:
   at least one DC/DC converter receiving power from said renewable power source and transmitting DC power from said at least one renewable power source to a DC bus;
   a three-phase DC/AC inverter receiving DC power from said at least one DC/DC converter by way of said DC bus, said DC/AC inverter converting said DC power from said DC bus into three phase AC power suitable for said power grid or said electric motor; and
   a control subsystem for controlling switches in said DC/AC inverter based on sensed output currents and voltages output from said inverter, said control subsystem determining reference vector fields based on said sensed output currents and voltages from said inverter and on sensed input currents and voltages from said DC bus, said reference vector fields being used by said control subsystem to generate switching signals for said switches in said DC/AC inverter.

2. The system according to claim 1, wherein said control subsystem comprises:
   a DC/DC control block for controlling said at least one DC/DC converter, said DC/DC control block receiving sensed currents and voltages from said at least one renewable power source;
   a motor identification block for determining characteristics of said electric motor, said motor identification block receiving said sensed output currents and voltages and a voltage for said DC bus;
   a differential geometric controller receiving outputs of said motor identification block and said DC/DC control block; and
   a modulator block for producing control signals for controlling said switches in said inverter, said modulator block receiving outputs of said differential geometric control block and using said outputs of said differential geometric control block to produce said control signals, wherein said differential geometric controller is a non-linear controller based on directly modulating a frequency of said motor to thereby maximize a torque output of said motor.

3. The system according to claim 2, wherein said differential controller comprises:
- a current conversion block for converting said sensed output currents from said inverter into independent current variables;
- a voltage conversion block for converting said sensed output voltages from said inverter into independent voltage variables;
- a magnitude control sub-block for producing a magnitude vector field for currents in said inverter based on signals from said DC bus, from said at least one renewable power source, and based on a reference voltage;
- a rotation control sub-block for producing a rotation angle for said vector field, said rotation angle being based on signals from said at least one renewable power source and on said independent voltage variables;
- a reference vector field generator sub-block for producing current references in a frame relative to said independent current and voltage variables, said current references being based on said magnitude vector field and on said rotation angle;
- a current controller sub-block for producing duty cycle and switching frequency signals based on said current references and on said independent current variables; and
- a modulator for producing switching pulses for switches in said inverter based on said duty cycle and switching frequency signals from said current controller sub-block.

4. The system according to claim 3, wherein said rotation control sub-block comprises:
- an impedance compensation sub-block for compensation for any phase-shift angle caused by an impedance of motor windings in said electric motor;
- a mechanical rotation sub-block for producing a mechanical rotation matrix in a specific Lie Group based on voltage signals in a back-emf angle; and
- a current rotation sub-block for producing a transpose of an electrical rotation matrix.

5. The system according to claim 3, wherein said magnitude control sub-block comprises:
- a DC-bus sub-block for producing magnitudes for said magnitude vector fields; and
- an optimal current phase controller sub-block for producing a phase angle for said magnitude vector fields.

6. A control subsystem for controlling switches in an inverter, the subsystem comprising:
- a DC/DC control block for controlling at least one DC/DC converter, said DC/DC control block receiving sensed currents and voltages from at least one renewable power source;
- a motor identification block for determining characteristics of an electric motor, said motor identification block receiving sensed output currents and voltages from said inverter and a voltage for a DC bus that receives power from said at least one DC/DC converter;
- a differential geometric controller receiving outputs of said motor identification block and said DC/DC control block; and
- a modulator block for producing control signals for controlling said switches in said inverter, said modulator block receiving outputs of said differential geometric control block and using said outputs of said differential geometric control block to produce said control signals.

7. The control subsystem according to claim 6, wherein said differential geometric controller comprises:
- a current conversion block for converting sensed output currents from said inverter into independent current variables;
- a voltage conversion block for converting sensed output voltages from said inverter into independent voltage variables;
- a magnitude control sub-block for producing a magnitude vector field for currents in said inverter based on signals from said DC bus, from said at least one renewable power source, and based on a reference voltage;
- a rotation control sub-block for producing a rotation angle for said vector field, said rotation angle being based on signals from said at least one renewable power source and on said independent voltage variables;
- a reference vector field generator sub-block for producing current references in a frame relative to said independent current and voltage variables, said current references being based on said magnitude vector field and on said rotation angle;
- a current controller sub-block for producing duty cycle and switching frequency signals based on said current references and on said independent current variables; and
- a modulator for producing switching pulses for switches in said inverter based on said duty cycle and switching frequency signals from said current controller sub-block.

8. The subsystem according to claim 7, wherein said rotation control sub-block comprises:
- an impedance compensation sub-block for compensation for any phase-shift angle caused by an impedance of motor windings in said electric motor;
- a mechanical rotation sub-block for producing a mechanical rotation matrix in a specific Lie Group based on voltage signals in a back-emf angle; and
- a current rotation sub-block for producing a transpose of an electrical rotation matrix.

9. The subsystem according to claim 7, wherein said magnitude control sub-block comprises:
- a DC-bus sub-block for producing magnitudes for said magnitude vector fields; and
- an optimal current phase controller sub-block for producing a phase angle for said magnitude vector fields.

* * * * *